US008550942B2

(12) United States Patent
Oda et al.

(10) Patent No.: US 8,550,942 B2
(45) Date of Patent: Oct. 8, 2013

(54) BICYCLE SHIFTING CONTROL APPARATUS

(75) Inventors: Yoshihiro Oda, Sakai (JP); Toshikuni Suzuki, Sakai (JP)

(73) Assignee: Shimano Inc., Osaka (JP)

( * ) Notice: Subject to any disclaimer, the term of this patent is extended or adjusted under 35 U.S.C. 154(b) by 1114 days.

(21) Appl. No.: 11/780,346

(22) Filed: Jul. 19, 2007

(65) Prior Publication Data

US 2008/0087126 A1    Apr. 17, 2008

(30) Foreign Application Priority Data

Oct. 12, 2006  (JP) ................. 2006-278471

(51) Int. Cl.
*F16H 9/00* (2006.01)
*F16H 59/00* (2006.01)
*F16H 61/00* (2006.01)
*F16H 63/00* (2006.01)

(52) U.S. Cl.
USPC ............................................. 474/81; 474/80

(58) Field of Classification Search
USPC ........ 474/81, 80, 82, 78; 280/261; 74/473.13, 74/502.2; 192/217
See application file for complete search history.

(56) References Cited

U.S. PATENT DOCUMENTS

| | | | | |
|---|---|---|---|---|
| 3,352,173 A | * | 11/1967 | Freeland | 74/473.13 |
| 3,406,587 A | * | 10/1968 | Brilando et al. | 74/473.14 |
| 3,633,437 A | * | 1/1972 | Ishida | 74/489 |
| 3,732,787 A | * | 5/1973 | Yamaguchi | 192/142 R |
| 3,965,763 A | * | 6/1976 | Wechsler | 474/81 |
| 4,055,093 A | * | 10/1977 | Ross | 74/501.6 |
| 4,065,983 A | * | 1/1978 | Mimura | 74/625 |
| 4,143,557 A | * | 3/1979 | Wakebe et al. | 474/80 |
| 4,270,481 A | * | 6/1981 | Watarai | 116/28.1 |
| 4,279,174 A | * | 7/1981 | Ross | 74/473.14 |
| 4,325,267 A | * | 4/1982 | Kojima | 74/489 |
| 4,412,828 A | * | 11/1983 | Darby | 474/81 |
| 4,490,127 A | * | 12/1984 | Matsumoto et al. | 474/110 |
| 4,530,678 A | * | 7/1985 | Wechsler | 474/81 |
| 4,859,984 A | * | 8/1989 | Romano | 340/432 |
| 5,052,241 A | * | 10/1991 | Nagano | 74/502.2 |
| 5,178,033 A | * | 1/1993 | Kund | 74/501.5 R |
| 5,213,548 A | * | 5/1993 | Colbert et al. | 474/71 |
| 5,325,735 A | * | 7/1994 | Nagano | 74/502.2 |
| 5,357,177 A | * | 10/1994 | Fey et al. | 318/3 |

(Continued)

FOREIGN PATENT DOCUMENTS

| | | |
|---|---|---|
| CN | 1821015 A | 8/2006 |
| EP | 1 473 220 A1 | 11/2004 |
| JP | 2002-302090 A | 10/2002 |
| JP | 2005-238873 A | 9/2005 |

*Primary Examiner* — William A Rivera
*Assistant Examiner* — Henry Liu
(74) *Attorney, Agent, or Firm* — Global IP Counselors (57) ABSTRACT

A bicycle shifting control apparatus is provided with a gearshift operating part and an actuating unit. The gearshift operating part outputs a first chain moving operation and a second chain moving operation for moving a front derailleur via the actuating unit. The actuating unit includes a first actuating part and a second actuating part. The first actuating part performs a first action for moving the front derailleur from a first position corresponding to a small sprocket a second position corresponding to an adjacent larger sprocket in accordance with the first chain moving operation of the gearshift operating part. The second actuating part performs a second action for moving the front derailleur to a third position located past the second position corresponding to the larger sprocket in accordance with the second chain moving operation of the gearshift operating part.

21 Claims, 10 Drawing Sheets

(56) References Cited

U.S. PATENT DOCUMENTS

| | | | |
|---|---|---|---|
| 5,400,675 A * | 3/1995 | Nagano | 74/502.2 |
| 5,470,277 A * | 11/1995 | Romano | 474/70 |
| 5,476,019 A * | 12/1995 | Cheever et al. | 74/506 |
| 5,577,969 A * | 11/1996 | Watarai | 474/78 |
| 5,588,331 A * | 12/1996 | Huang et al. | 74/489 |
| 5,601,001 A * | 2/1997 | Kawakami et al. | 74/502.2 |
| 5,632,226 A * | 5/1997 | Huang et al. | 116/295 |
| 5,676,022 A * | 10/1997 | Ose | 74/502.2 |
| 5,678,455 A * | 10/1997 | Watarai | 74/473.3 |
| 5,802,923 A * | 9/1998 | Hara | 74/473.13 |
| 5,862,709 A * | 1/1999 | Kageyama | 74/489 |
| 6,015,036 A * | 1/2000 | Fukuda | 192/217 |
| 6,216,078 B1 * | 4/2001 | Jinbo et al. | 701/70 |
| 6,389,925 B1 * | 5/2002 | Ose | 74/502.2 |
| 6,394,021 B1 * | 5/2002 | Caron et al. | 116/28.1 |
| 6,450,059 B1 * | 9/2002 | Ose | 74/501.6 |
| 6,553,861 B2 * | 4/2003 | Ose | 74/502.2 |
| 6,564,671 B2 * | 5/2003 | Ose | 74/502.2 |
| 6,698,567 B2 * | 3/2004 | Dal Pra' | 192/217 |
| 6,899,649 B2 * | 5/2005 | Ichida et al. | 474/70 |
| 6,991,081 B2 * | 1/2006 | Uno et al. | 192/217 |
| 7,007,785 B2 * | 3/2006 | Uno et al. | 192/217 |
| 7,015,598 B2 * | 3/2006 | Oohara | 307/47 |
| 7,080,723 B2 * | 7/2006 | Uno et al. | 192/217 |
| 7,159,881 B2 * | 1/2007 | Guderzo et al. | 280/260 |
| 7,184,872 B2 * | 2/2007 | Guderzo | 701/51 |
| 7,228,756 B2 * | 6/2007 | Tsumiyama | 74/502.2 |
| 7,285,064 B2 * | 10/2007 | Ichida et al. | 474/80 |
| 7,292,923 B2 * | 11/2007 | Guderzo | 701/51 |
| 7,350,436 B2 * | 4/2008 | Fujii | 74/473.13 |
| 2005/0109577 A1 * | 5/2005 | Uno et al. | 192/217 |
| 2005/0145462 A1 * | 7/2005 | Uno et al. | 192/217 |
| 2005/0211014 A1 * | 9/2005 | Fujii | 74/625 |
| 2005/0229735 A1 * | 10/2005 | Fujii | 74/473.3 |
| 2006/0148602 A1 * | 7/2006 | Iwasaki | 474/78 |
| 2006/0189423 A1 * | 8/2006 | Ichida et al. | 474/80 |
| 2008/0087126 A1 * | 4/2008 | Oda et al. | 74/473.13 |

* cited by examiner

BICYCLE SHIFTING CONTROL APPARATUS

CROSS-REFERENCE TO RELATED APPLICATIONS

This application claims priority under 35 U.S.C. §119 to Japanese Patent Application No. 2006-278471, filed Oct. 12, 2006. The entire disclosure of Japanese Patent Application No. 2006-278471 is hereby incorporated herein by reference.

BACKGROUND OF THE INVENTION

1. Field of the Invention

This invention generally relates to a shifting control apparatus. More specifically, the present invention relates to a bicycle shifting control apparatus for moving an electrically controllable front derailleur between multiple sprockets that are aligned so that the number of teeth increases outward in the axial direction.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, bicycle gear shifting control systems have been extensively redesigned so as to be electrically operated.

Externally mounted gearshift devices which operate a front derailleur and rear derailleur are known as bicycle gearshift devices. In externally mounted gearshift devices of this type, a gearshift operation is performed as a result of the chain being moved by the front derailleur to one of a plurality of front sprockets that are lined up in the axial direction and mounted on the crank axle, or being moved by the rear derailleur to one of a plurality of rear sprockets that are lined up in the axial direction and mounted on the rear wheel hub shaft. In such externally mounted gearshift devices, gearshift operating parts that can cause an electrically controllable derailleur (which can move the chain by an actuator such as a motor or the like) to perform a gearshift operation have been known in the past (for example, see Japanese Laid-Open Patent Application No. 2005-238873).

With conventional techniques for controlling gear shifting by using an electrically controllable derailleur, the gears are shifted up or down at the press of an operating button in a gearshift operating part, for example. When the gears are downshifted from a large-diameter sprocket to a small-diameter sprocket with the front derailleur, sometimes a phenomenon known as chain skip occurs, in which the chain moves further inward past the small-diameter sprocket and comes off. When the chain skips, sometimes the rider must stop the bicycle, lay the bicycle down, and manually return the chain to the sprocket. Therefore, sometimes the bicycle can no longer be ridden when the chain skips, which may cause a crucial delay if the chain skips during a race.

In view of the above, it will be apparent to those skilled in the art from this disclosure that there exists a need for an improved bicycle shifting control apparatus. This invention addresses this need in the art as well as other needs, which will become apparent to those skilled in the art from this disclosure.

SUMMARY OF THE INVENTION

One object of the present invention is to make it easy to smoothly return the chain and to continue riding the bicycle when the chain skips in a bicycle shifting control apparatus for controlling an electrically controllable front derailleur.

The foregoing object can basically be attained according to a first aspect by providing a bicycle shifting control apparatus for operating an electrically controllable front derailleur between a plurality of sprockets. In accordance with the first aspect, the bicycle shifting control apparatus basically comprises a gearshift operating part and an actuating unit. The gearshift operating part is configured and arranged to output a first chain moving operation and a second chain moving operation for a front derailleur. The actuating unit is operatively arranged to move the front derailleur in response to operation of the gearshift operating part. The actuating unit includes a first actuating part and a second actuating part. The first actuating part is configured and arranged to perform a first action for moving the front derailleur from a first position corresponding to a first sprocket having a smaller number of teeth to a second position corresponding to an adjacent second sprocket having a larger number of teeth in accordance with the first chain moving operation of the gearshift operating part. The second actuating part is configured and arranged to perform a second action for moving the front derailleur to a third position located past the second position corresponding to the second sprocket having the largest number of teeth in accordance with the second chain moving operation of the gearshift operating part.

When the first chain moving operation is performed by the shifting control apparatus, the front derailleur moves from the first position to the second position, and the gears are upshifted. When the second chain moving operation is performed, the front derailleur moves past the second position of the sprocket having a larger number of teeth to the third position. When the front derailleur thus moves past the sprocket that has the largest number of teeth and that is located the farthest axially outward, the chain, which has skipped past the sprocket located the farthest axially inward, will then easily be guided to the outermost sprocket by the front derailleur. The chain is easily guided to this sprocket because the front derailleur can be moved in the second chain moving operation to the third position located past the second position of the sprocket having the largest number of teeth. Therefore, it is easy to smoothly return the chain and to continue riding the bicycle when the chain skips.

The bicycle shifting control apparatus according to a second aspect is the apparatus of the first aspect wherein the gearshift operating part includes a rider operating member, a first switch configured and arranged to perform the first chain moving operation when the rider operating member is moved from a first operating position to a second operating position and a second switch configured and arranged to perform the second chain moving operation when the rider operating member is moved from one of the first and second operating position to a third operating position. In this case, the second chain moving operation is performed when the front derailleur is moved from the first operating position to the third operating position past the second operating position, and the first chain moving operation is performed when the front derailleur stops at the second operating position. Therefore, two operations can be performed with a unidirectional operation, and the second chain moving operation can be easily performed.

The bicycle shifting control apparatus according to a third aspect is the apparatus of the second aspect wherein the rider operating member is moved from the first operating position through the second operating position to the third operating position, with the rider operating member closes the first and second switches disposed separately at the second and third operating positions when the rider operating member is operated from the first operating position to the third operating position. In this case, the first chain moving operation is performed when the operating member is operated from the first operating position to the second operating position, and the second chain moving operation is performed when the operating member is operated further to the third operating position. Therefore, two operations can be performed easily with one operating member.

The bicycle shifting control apparatus according to a fourth aspect is the apparatus of the third aspect wherein the operating member is mounted to pivot around an axis, with the first, second and third operating positions being disposed at intervals in a moving direction of the operating member about the axis. In this case, the first chain moving operation and second chain moving operation can be performed easily by an operation that has the same direction as the movement of the operating member around an axis.

The bicycle shifting control apparatus according to a fifth aspect is the apparatus of the first aspect wherein the gearshift operating part includes a first rider operating member, a first switch configured and arranged to perform the first chain moving operation when the first rider operating member is operated, a second rider operating member, and a second switch configured and arranged to perform the second chain moving operation when the second rider operating member is operated. In this case, operating errors are not likely because the first chain moving operation and the second chain moving operation can be performed separately with two operating members that include a first and second operating member.

The bicycle shifting control apparatus according to a sixth aspect is the apparatus of any of the first through fifth aspects wherein the gearshift operating part is further configured and arranged to output a third chain moving operation for the front derailleur, and the actuating unit further includes a third actuating part configured and arranged to perform a third action for moving the front derailleur from the second position to the first position in accordance with the third chain moving operation of the gearshift operating part. In this case, the front derailleur is moved from the second position to the first position, and the gears are downshifted when the third chain moving operation is performed.

The bicycle shifting control apparatus according to a seventh aspect is the apparatus of any of the first through sixth aspects wherein the actuating unit is configured to locate the third position within a range of 0.2 mm to 7.5 mm past the second position. In this case, when the third position is separated from the second position by 1 mm or more, for example, a chain guard is provided to prevent the chain from skipping axially outward from the sprocket having the largest number of teeth. When the third position is separated from the second position by a distance of less than 1 mm, no additional components are needed because the chain is not likely to come off.

According to the present invention, since the front derailleur can be moved in the second chain moving operation to the third position located past the second position of the sprocket having the largest number of teeth, the chain is easily guided to the sprocket when the chain skips. Therefore, it is easy to smoothly return the chain and continue riding the bicycle when the chain skips.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
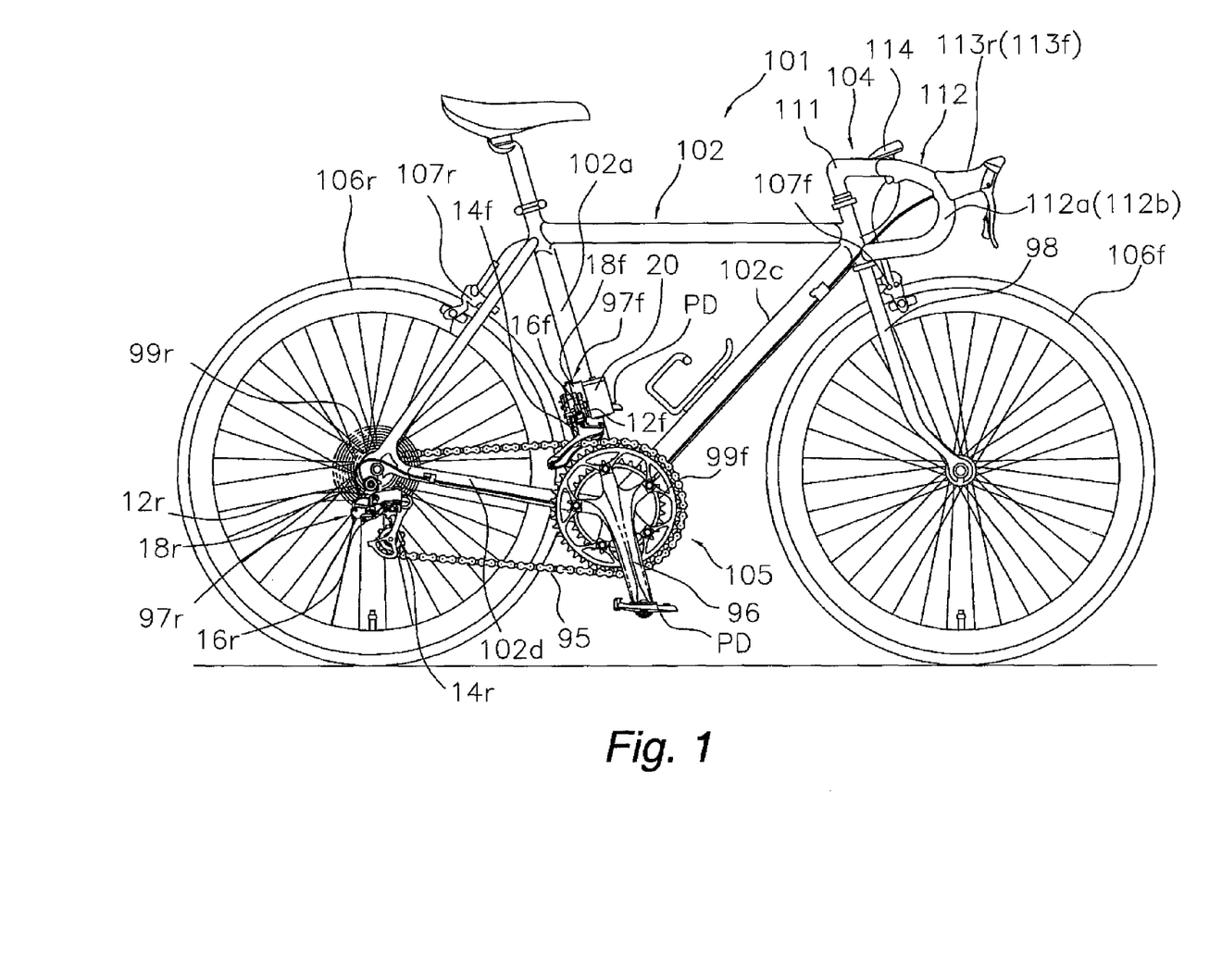
FIG. 1 is a side elevational view of a bicycle having a gear shifting control system with a pair of bicycle brake/derailleur operating units in accordance with a first embodiment of the present invention.

Referring initially to FIG. 1, a bicycle 101 is illustrated in accordance with a first embodiment of the present invention. FIG. 1 shows a bicycle 101 in which an embodiment of the present invention is employed. The bicycle 101 is a "road racer" (racing style road bike). The bicycle 101 basically includes a diamond-shaped frame 102 having a front fork 98, a handlebar unit 104 fastened to the front fork 98, a drive unit 105, a front wheel 106$f$ mounted to the front fork 98 and a rear wheel 106$r$ mounted to a rear portion of the frame 102. The drive unit 105 basically includes a chain 95, a crank 96 on which pedals PD are mounted, a motorized front derailleur 97$f$, a motorized rear derailleur 97$r$, a front sprocket cluster 99$f$, and a rear sprocket cluster 99$r$. The rear and front derailleurs 97$r$ and 97$f$ are examples of bicycle gear changing devices in accordance with one embodiment. The bicycle 101 also includes a front brake device 107$f$, a rear brake device 107$r$, and a pair (right and left) brake/derailleur operating units 113$r$ and 113$f$. The right brake/derailleur operating unit 113$r$ is configured to control the rear derailleur 97$r$ and the rear brake device 107$r$. The left brake/derailleur operating unit 113$f$ is configured to control the front derailleur 97$f$ and the front brake device 107$f$. The brake/derailleur operating units 113$r$ and 113$f$ are provided with a rear gearshift operating part 121r and a front gearshift operating part 121f, which are examples of gear shifters in accordance with one embodiment.

The handlebar unit 104 comprises a handlebar stem 111 and a handlebar 112 that is fitted into and fastened to the upper end of the handlebar stem 111 as shown in FIG. 1. The handlebar stem 111 is fitted into and fastened to the upper part of the front fork 98. The handlebar 112 is a drop-type handlebar having U-shaped curved sections 112a and 112b on both ends thereof, and the curved sections 112a and 112b are arranged such that the curved portions thereof protrude in the forward direction. The brake/derailleur operating units 113r and 113f are mounted on the handlebar 112 for operating the rear and front derailleurs 97r and 97f, and the rear and front brake devices 107r and 107f, respectively. The brake/derailleur operating unit 113r is arranged on the right-hand end of the handlebar 112 when the bicycle 101 is viewed from the rear. The brake/derailleur operating unit 113f is arranged on the left-hand end.

The brake/derailleur operating units 113r and 113f are connected to the rear and front brake devices 107r and 107f, respectively, with Bowden-type brake cables (not shown). The brake/derailleur operating units 113r and 113f are also connected to the rear and front derailleurs 97r and 97f, respectively, with electrical wires. A cycle computer 114 is configured to display speed and traveled distance of the bicycle is arranged in a middle portion of the handlebar 112. Thus, the cycle computer 114 functions as a speed indicator.

Figure 2:
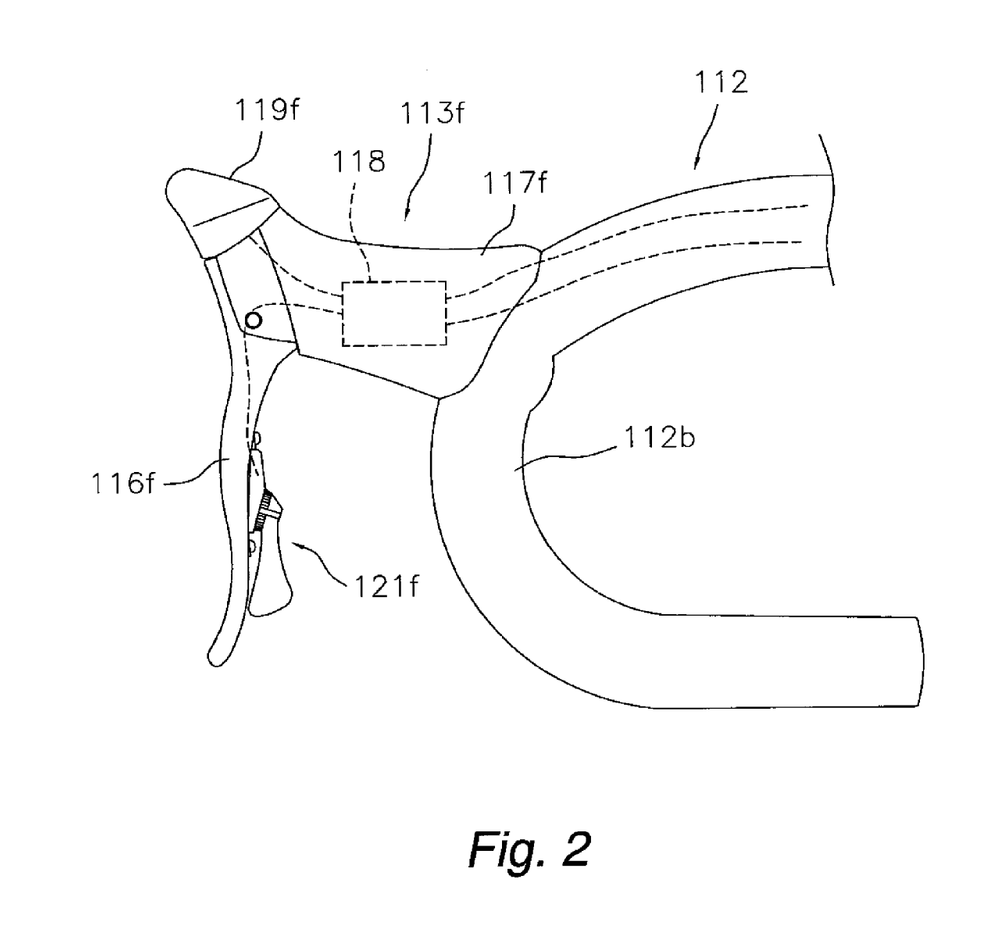
FIG. 2 is an enlarged, side elevational view of the area of the left end of the handlebar with the left brake/derailleur operating unit.

As shown in FIG. 2, the brake/derailleur operating unit 113f has a front brake bracket 117f mounted on the curved section 112b of the handlebar 112 and a front brake lever 116f pivotally disposed on the front brake bracket 117f. The front brake lever 116f controllably operates the front brake device 107f. The front gearshift operating part 121f is mounted on the rear side of the brake lever 116f for performing a chain moving operation of the front derailleur 97f. Also, the brake/derailleur operating unit 113f is provided with a gear position display device 119f, which has a liquid crystal display for showing, for example, the shifted positions. The gear position display device 119f is fixed on an upper side of a distal end of the brake bracket 117f.

Figure 3:
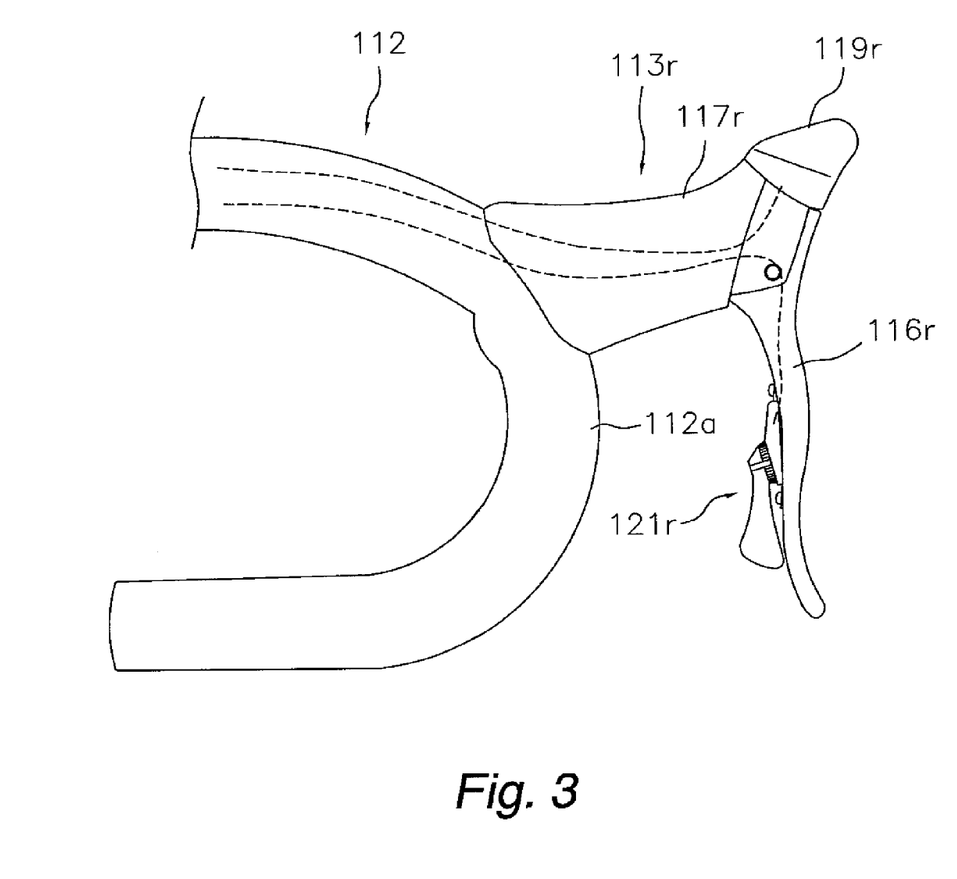
FIG. 3 is an enlarged, side elevational view of the area of the right end of the handlebar with the right brake/derailleur operating unit.

As shown in FIG. 3, the brake/derailleur operating unit 113r has a rear brake bracket 117r mounted on the curved section 112a of the handlebar 112 and a rear brake lever 116r pivotally disposed on the rear brake bracket 117r. The rear brake lever 116r controllably operates the rear brake device 107r. The rear gearshift operating part 121r is mounted on the rear side of the brake lever 116r for performing a chain moving operation of the rear derailleur 97r. Also, the brake/derailleur operating unit 113r is provided with a gear position display device 119r, which has a liquid crystal display for showing, for example, the shifted positions. The gear position display device 119r is fixed on an upper side of a distal end of the brake bracket 117r.

Figure 4:
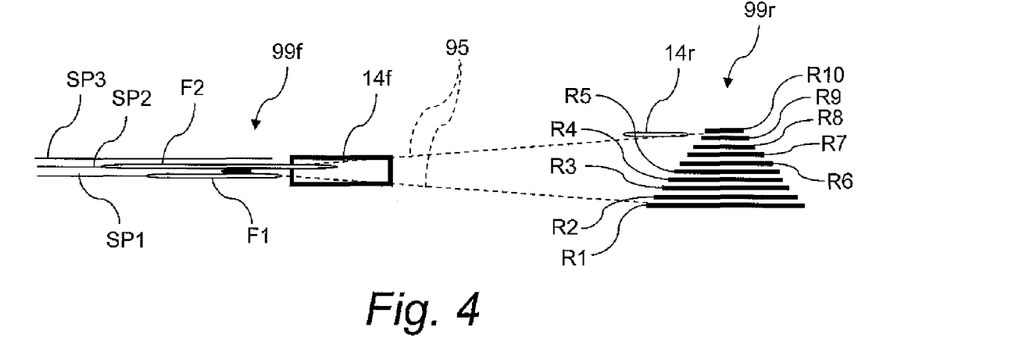
FIG. 4 is a simplified schematic view of a bicycle drive train showing the arrangement of the front and rear sprocket clusters.

In the front, the sprocket F1 on the axial inner side has a smaller number of teeth than the sprocket F2 on the axial outer side, and the sprocket on the upper side (higher speed side) with the greater number of teeth is the sprocket F2. In the rear, the number of teeth becomes sequentially smaller starting with the sprocket R1, which is the farthest inward; the sprocket R10 located the farthest outward has the smallest number of teeth; and the sprocket on the top side (higher speed side) is the sprocket R10. The gears are shifted by the front and rear derailleurs 97f and 97r moving the chain 95 among the sprockets F1 and F2, and R1 to R10. The gearshift operating parts 121f and 121r perform this chain moving operation.

As shown in FIG. 4, the front sprocket cluster 99f has two sprockets F1 and F2 that are arranged (separated from each other) along the axial direction of the crank shaft and that have different tooth counts. Similarly, the rear sprocket cluster 99r has ten sprockets R1 to R10 that are arranged (separated from each other) along the axial direction of the rear wheel hub shaft (axle) and have different tooth counts. The inner front sprocket F1 has a smaller tooth count than the outer front sprocket F2, i.e., the front sprocket F2 is the higher-gear sprocket. The tooth counts of the rear sprockets decrease successively from the innermost sprocket R1 to the outermost sprocket R100, the outermost sprocket R10 having the smallest tooth count and being the highest gear sprocket. The front and rear derailleurs 97f and 97r are configured to execute shift operations to move the chain 95 to any of the front sprockets F1 and F2 and the rear sprockets R1 to R10. The rider initiates these shift operations by operating the gearshift operating parts 121f and 121r.

The front derailleur (FD) 97f is mounted to a seat tube 102a of the frame 102. The front derailleur 97f is configured such that it can be controlled electrically. Thus, the front derailleur 97f is an electrically driven derailleur configured to guide the chain 95 to a first position SP1 corresponding to the sprocket F1, or to a second position SP2 corresponding to the sprocket F2, as shown in FIG. 4. The front derailleur 97f basically includes a mounting member 12f, a chain guide 14f and a four-point linkage mechanism 16f. The mounting member 12f is fastened to the seat tube 102a of the frame 102. The chain guide 14f is configured and arranged such that it can be moved toward and away from the mounting member 12f. The chain guide 14f guides the chain 95 by moving between the first position SP1 and the second position SP2. The four-point linkage mechanism 16f is arranged to connect the chain guide 14f to the mounting member 12f. The front derailleur 97f is operated with an electric drive device 18f that is arranged and configured to drive the four-point linkage mechanism 16f in such a manner as to move the chain guide 14f.

The front derailleur 97f is also capable of moving the chain guide 14f to a third position SP3 that is past the second position SP2 in accordance with the operation of the gearshift operating part 121f as shown in FIG. 4. The third position SP3 corresponds to a position just outside of the large-diameter sprocket having the largest number of teeth. In this embodiment, the third position is located farther past the second position that corresponds to the sprocket F2. Specifically, the third position SP3 exceeds the second position SP2 axially outward by 0.2 mm to 7.5 mm. In cases in which the third position SP3 exceeds the second position SP2 by 1 mm or greater, it is preferable that a chain guard 14f be provided to the axially outer side of the sprocket F2 to prevent the chain 95 from moving past the sprocket F2 and falling off.

Figure 5:
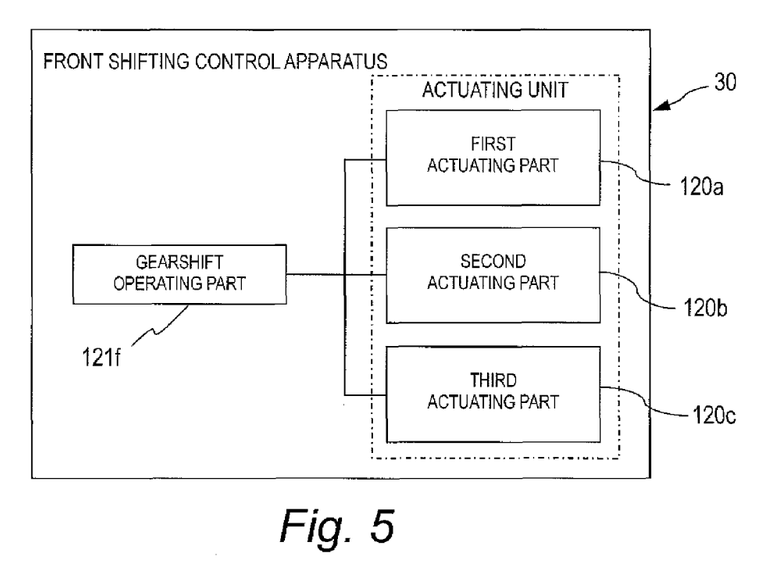
FIG. 5 is a functional block diagram showing the system configuration of the front shifting control apparatus.

The front derailleur 97f is controlled by a front shifting control apparatus 30 shown in FIG. 5. Functionally speaking, the front shifting control apparatus 30 includes the gearshift operating part 121f and an actuating unit which includes first through third actuating parts 120a, 120b and 120c that perform actions in accordance with the operation of the gearshift operating part 121f.

The gearshift operating part 121f performs first through third chain moving operations of the front derailleur 97f. The first chain moving operation upshifts the front derailleur 97f, and the third chain moving operation downshifts the front derailleur 97f. The second chain moving operation is an operation for returning the chain 95 to the sprocket F2 when the downshifting or other operation of the front derailleur 97f causes the chain 95 to skip and come off on the inside of the sprocket F2. In the second chain moving operation, since the chain guide 14f can be guided axially outward from the second position SP2, the chain 95 can be smoothly shifted from the sprocket F1 to the sprocket F2 even when a large amount of tension is applied to the chain 95 because of an uphill ride or the like.

The first actuating part 120a performs a first action in accordance with the first chain moving operation. This first action is an upshifting action for moving the chain guide 14f of the front derailleur 97f from the first position SP1 corresponding to the sprocket F1, which, of the two adjacent sprockets F1 and F2, has a smaller number of teeth, to the second position SP2 corresponding to the sprocket F2, which a larger number of teeth. The second actuating part 120b performs a second action in accordance with the second chain moving operation. This second action is a chain-returning action for moving the chain guide 14f of the front derailleur 97f to the third position SP3, which is farther past the second position SP2 that corresponds to the sprocket F2 having the largest number of teeth. The third actuating part 120c performs a third action in accordance with the third chain moving operation, and this third action is a downshifting action for moving the front derailleur 97f from the second position SP2 to the first position SP1.

The first position SP1 and the second position SP2 are positions that correspond to the two adjacent large and small sprockets when the gears are shifted. For example, if the sprocket cluster 99f includes three sprockets, then the first position SP1 corresponds to the smallest-diameter sprocket and the second position SP2 corresponds to a medium-diameter sprocket in cases in which the gears are shifted between the smallest-diameter sprocket having the smallest number of teeth, and the medium-diameter sprocket which is a medium-sized sprocket. Also, if the sprocket cluster 99f includes three sprockets, then the first position corresponds to the medium-diameter sprocket and the second position corresponds to the largest-diameter sprocket in cases in which the gears are shifted between the medium-diameter sprocket and the largest-diameter sprocket that has the largest number of teeth. The third position SP3 is located farther past the second position SP2 that corresponds to the largest-diameter sprocket having the largest number of teeth even in the case of three sprockets.

Figure 6:
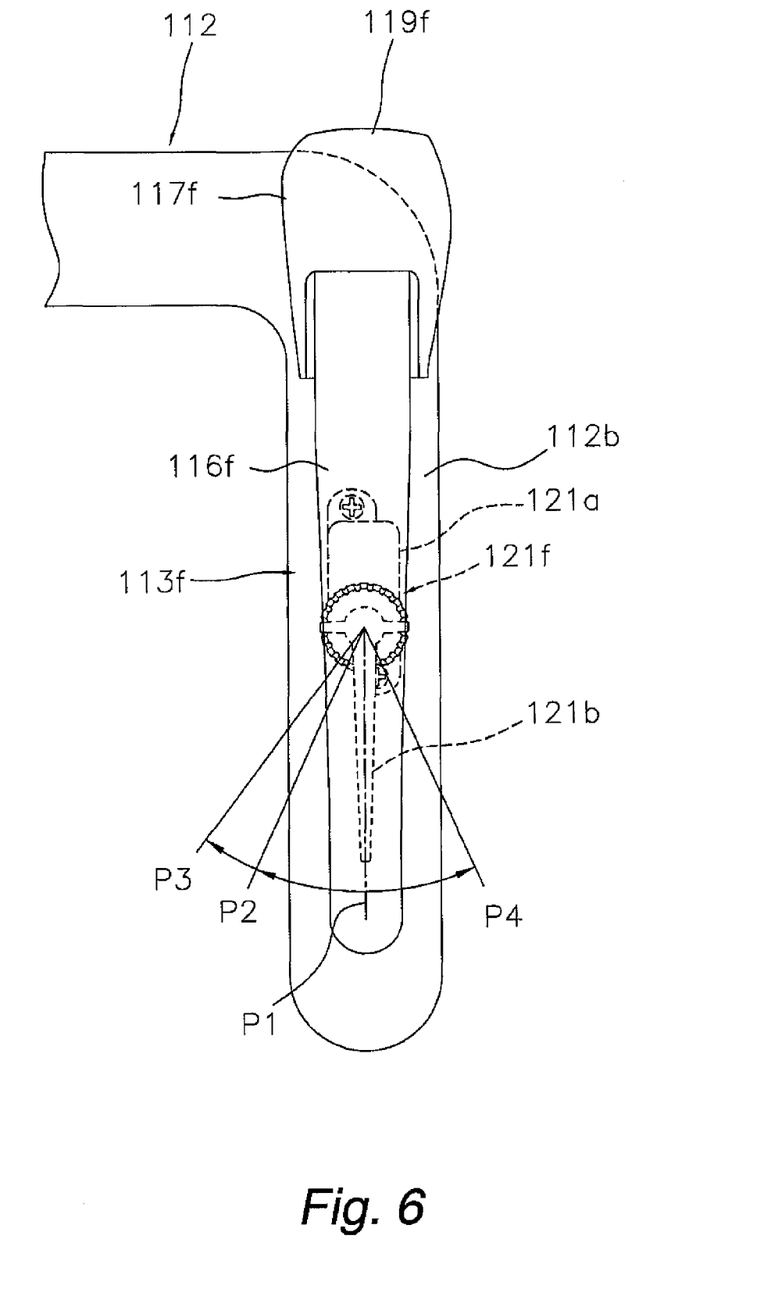
FIG. 6 is an enlarged front elevational view of the area surrounding the left end of the handlebar with the left brake/derailleur operating unit.
Figure 7:
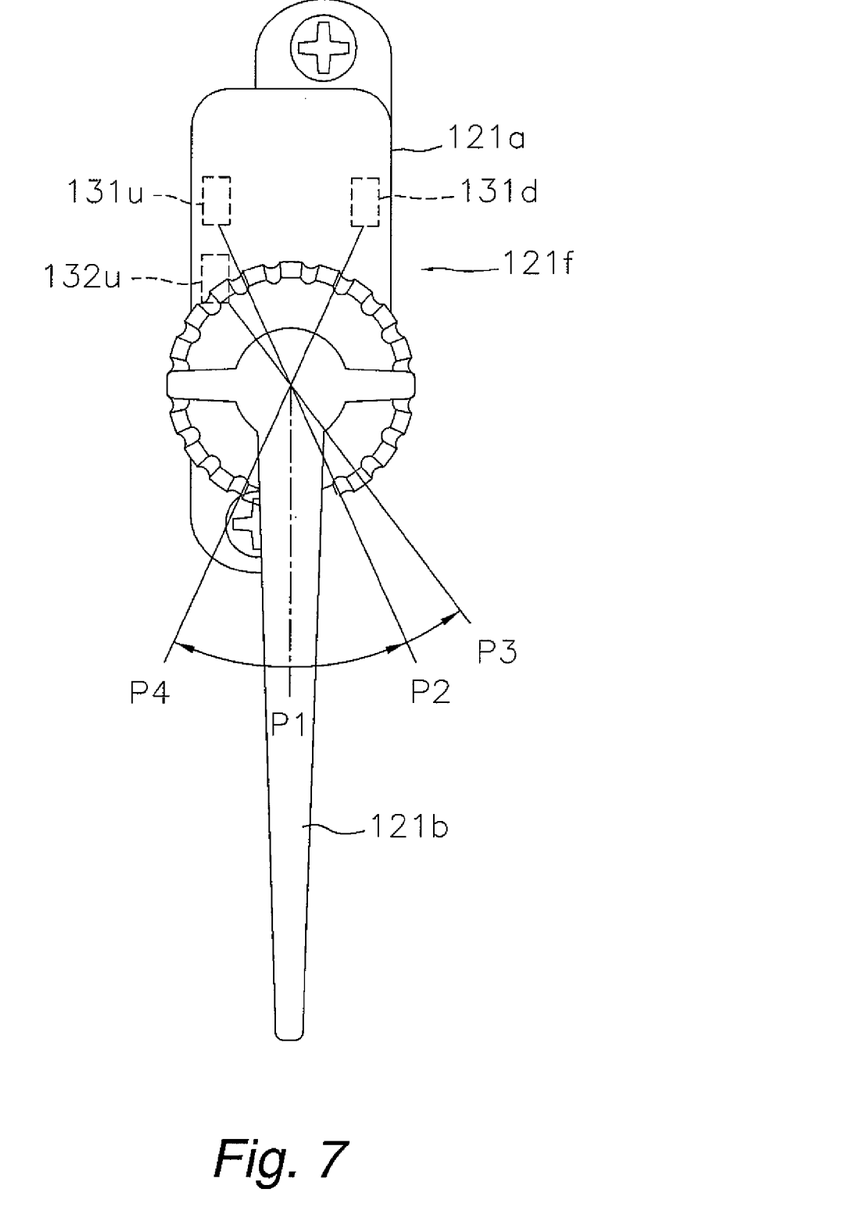
FIG. 7 is a enlarged front elevational view of a gearshift operating part of the front gear shifter.

As shown in FIGS. 6 and 7, the gearshift operating part 121f has a mounting unit 121a that can be mounted on the reverse side of the brake lever 116r, and an operating member 121b that is pivotally mounted on the mounting unit 121a. The operating member 121b is capable of pivoting from a neutral first operating position P1 to a second operating position P2 closer to the middle of the handlebar 112, and also to a third operating position P3 disposed further towards the middle of the handlebar 112. The operating member 121b is also capable of oscillating from the first operating position P1 to a fourth operating position P4 closer to the outer side of the handlebar 112. These operating positions are disposed at intervals in the direction in which the operating member 121b operates. The gearshift operating part 121f furthermore has first and second switches 131u and 132u disposed at the second and third operating positions P2, P3, and a third switch 131d disposed at the fourth operating position P4. The first switch 131u is a switch for the first chain moving operation of upshifting, and the third switch 113d is a switch for the third chain moving operation of downshifting. The second switch 132u is a switch for the second chain moving operation of returning the chain 95. These switches 131u, 131d, and 132u are configured using tactile switches or other microswitches, or contacts or the like.

Figure 8:
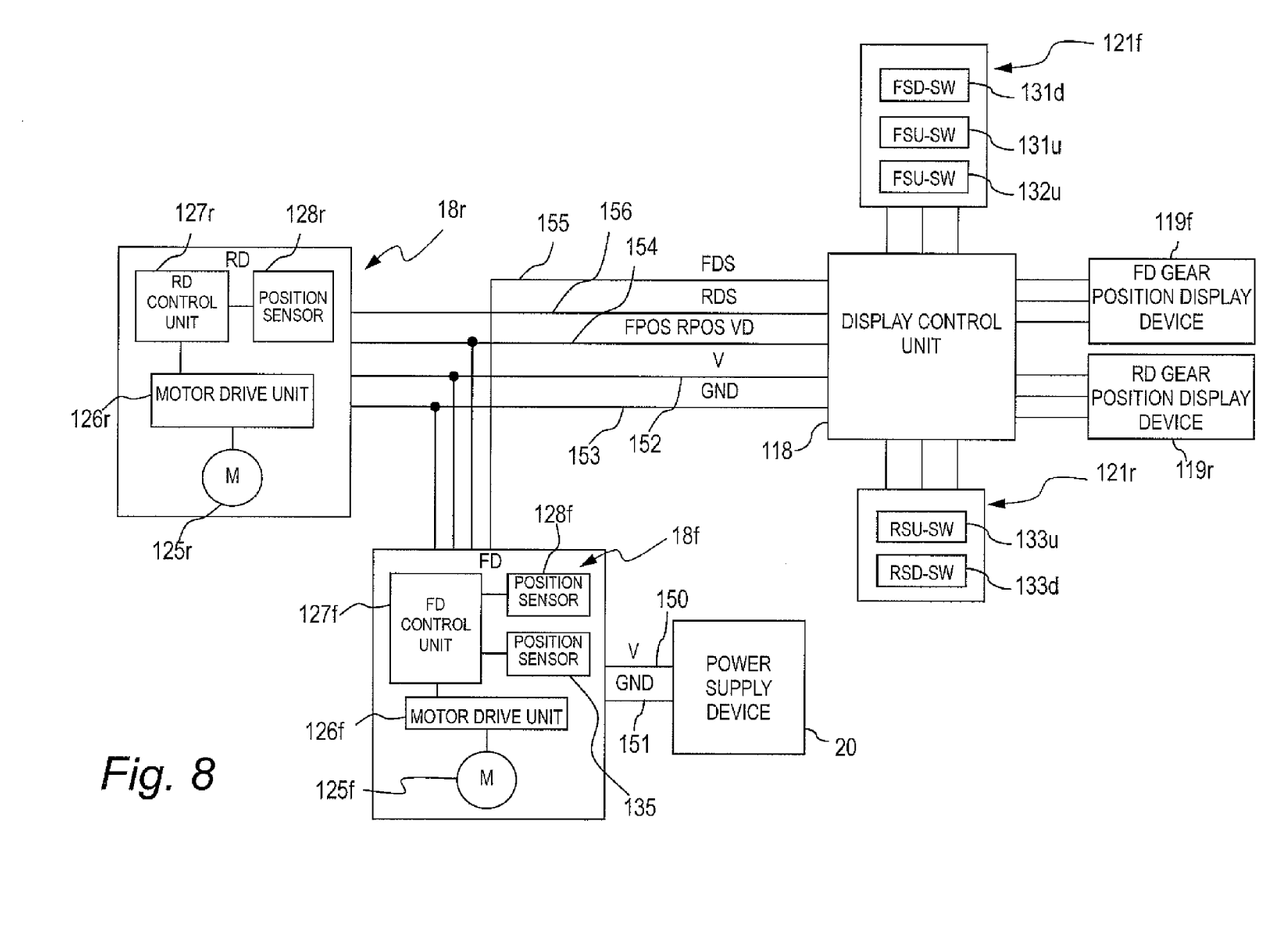
FIG. 8 is a block diagram showing the entire configuration of the gear shifting control system.

The gearshift operating part 121r for operating the rear derailleur 97r is different from the gearshift operating part 121f and does not have a second switch for returning the chain, but instead has a first switch 133u for upshifting and a second switch 133d for downshifting, as shown in FIG. 8. The configuration is otherwise the same as the gearshift operating part 121f.

The operating member 121b is disposed at the neutral first operating position P1 when not operated. When the operating member 121b is swung from the first operating position P1 to the third operating position P3, the first and second switches 131u and 132u are closed and turned "on" individually. The switches 131u and 132u do not turn on when operating member 121b is operated from the third operating position P3 towards the first operating position.

When the first chain moving operation is performed by moving the operating member 121b from the first operating position P1 to the second operating position P2, the first actuating part 120a takes effect and the gears are upshifted to guide the chain 95 from the sprocket F1 to the sprocket F2. When the third chain moving operation is performed by moving the operating member 121b from the first operating position P1 towards the fourth operating position P4, the third actuating part 120c takes effect and the gears are downshifted to guide the chain 95 from the sprocket F2 to the sprocket F1. Furthermore, when the second chain moving operation is performed by moving the operating member 121b from the first operating position P1 towards the third operating position P3, the second actuating part 120b takes effect to guide the chain 95 from the sprocket F1 to the third position SP3 located past the sprocket F2, and the chain 95 is pulled axially outward by the sprocket F2 even when the chain 95 has skipped. The chain 95 is easily caught on the sprocket F2, and the chain 95 is easily returned "on" to the sprocket F2.

The first through third actuating parts 120a to 120c are provided with the electric drive device 18f that drives the chain guide 14f via the four-point link mechanisms 16f, as shown in FIG. 1. The electric drive device 18f is linked to the front derailleur 97f. The electric drive device 18f and other electric devices are powered by a power supply device 20 that is aligned with the electric drive device 18f.

As shown in FIG. 8, the electric drive device 18f includes a motor 125f, a motor drive unit 126f, a front control unit 127f (FD controller) and a position sensor 128f. The motor drive unit 126f, the front control unit 127f (FD controller) and/or a position sensor 128f form the front derailleur actuating unit (120a, 120b and 120c). The motor 125f is configured and arranged to drive the front derailleur 97f. The motor drive unit 126f is configured and arranged to drive the motor 125f. The front control unit 127f is configured and arranged to control the motor drive unit 126f in response to a shift signal from the gearshift operating part 121f. The position sensor 128f is configured and arranged to control sense the shifted position of the front derailleur 97f.

The rear derailleur (RD) 97r is configured such that it can be controlled electrically. The rear derailleur (RD) 97r is mounted to a rear portion of a chain stay 102d of the frame 102. The rear derailleur 97r is configured to move to, for example, to any one of ten indexing positions R1 or R10 in response to gear shifting operations of the brake/derailleur operating unit 110a and to guide the chain 95 onto the corresponding sprocket of the rear sprocket cluster 99r. The rear derailleur 97r basically includes a mounting member 12r, a chain guide 14r and a four-point linkage mechanism 16r. The mounting member 12r is fastened to the rear portion of the chain stay 102d of the frame 102. The chain guide 14r is configured and arranged such that it can be moved relative to the mounting member 12r. The four-point linkage mechanism 16r is arranged to connect the chain guide 14r to the mounting member 12f. The front derailleur 97r is operated with an electric drive unit 18r that is arranged and configured to drive the four-point linkage mechanism 16r in such a manner as to move the chain guide 14r. The power supply device 20 serving as a power source for the front and rear derailleurs 97f and 97r is mounted to the front derailleur 97.

As shown in FIG. 8, the electric drive device 18r includes a motor 125r, a motor drive unit 126r, a rear control unit 127r for controlling the motor drive unit 126r, and a position sensor 128r for sensing the shifted position, as shown in FIG. 8. The motor 125r is configured and arranged to drive the rear derailleur 97r. The motor drive unit 126r is configured and arranged to drive the motor 125r. The rear control unit 127r is configured and arranged to control the motor drive unit 126r in response to a shift signal from the gearshift operating part 121r. The position sensor 128r is configured and arranged to sense the shifted position of the rear derailleur 97r.

The front and rear motor drive units 126f and 126r include motor drivers and deceleration units for decelerating the rotation of the motors 125f and 125r. The front and rear control units 127f and 127r have control circuits containing microcomputers that both have storage units, computation units, and the like; and software separately controls the motor drive parts 126f and 126r in accordance with shift signals outputted from the gearshift operating parts 121f and 121r. The front and rear position sensors 128f and 128r are sensors that use rotary encoders or the like, for example, to sense the shifted positions of the derailleurs 97f and 97r. A voltage sensor 135 is provided to sense the power supply voltage of the power supply device 20.

The components of the derailleurs 97f and 97r, the gearshift operating parts 121f and 121r, a display control unit 118, and the front and rear gear position display devices 119r and 119f are powered by the power supply device 20 mounted on the front derailleur 97f, as shown in FIG. 8. Specifically, the electric drive device 18f of the front derailleur 97f is powered by a power supply voltage V of about 6 to 8.4 V (DC), for example, from the power supply device 20 via a power supply line 150 and a grounding wire 151. Electric power having a power supply voltage V is also supplied from the electric drive device 18f to the electric drive device 18r of the rear derailleur 97r and the display control unit 118 via a power supply line 152 and a grounding wire 153.

Electric power having a power supply voltage V is also supplied to the front and rear gear position display devices 119r and 119f and the front and rear gearshift operating parts 121f and 121r via the display control unit 118. Shifted positions signals FPOS and RPOS of the front and rear position sensors 128f and 128r are outputted to the display control unit 118 via a position signal wire 154. The shifted positions signals FPOS and RPOS of the front and rear position sensors 128f and 128r are converted to display signals in the display control unit 118. The shifted positions of the front and rear derailleurs 97f and 97r are displayed on the front and rear gear position display devices 119r and 119f. Shift signals FDS and RDS outputted in accordance with the operation of the gearshift operating parts 121f and 121r pass through respective gearshift signal lines 155 and 156 via the display control unit 118 and are outputted to the front and rear derailleurs 97f and 97r. In actual practice, the gearshift signal line 156 for the shift signal RDS is connected to the electric drive device 18r via the electric drive device 18f. Therefore, the electric drive device 18f of the front derailleur 97f is connected to the display control unit 118 via a down tube 102c by, e.g., five wires, and the electric drive device 18r is connected to the electric drive device 18f via the chain stay 102d by, e.g., four wires. Accordingly, a connector that connects all of the five-core wiring can also be disposed in the electric drive device 18f.

The following is a description of the outline of the control process performed by the front control unit 127f. The description is an example of the control process, and the control process of the present invention is not limited to the one described here.

Figure 9:
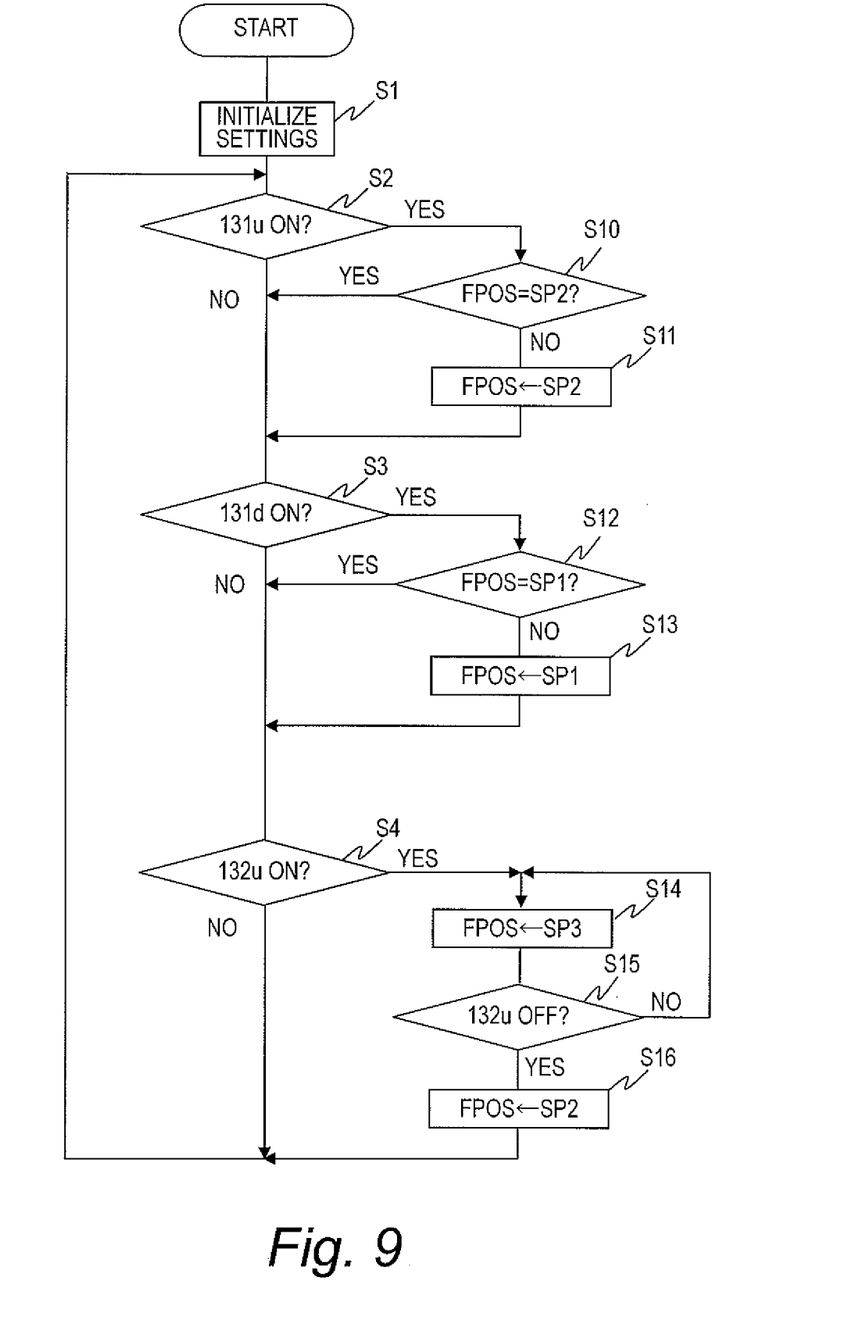
FIG. 9 is a control flowchart showing the processing executed by the front control part of the gear shifting control apparatus in accordance with one embodiment.

In the front control unit 127f, initial settings are performed in step S1 when the power supply is switched "on", as shown in FIG. 9. Various flags and variables are initialized by these initial settings. In step S2, a determination is made as to whether the first switch 131u of the front gearshift operating part 121f has been turned "on". It is thereby determined whether the first chain moving operation for upshifting has been performed. In step S3, a determination is made as to whether the third switch 131d of the gearshift operating part 121f has been turned "on". It is thereby determined whether the third chain moving operation for downshifting has been performed. In step S4, a determination is made as to whether the second switch 132u has been turned "on". It is thereby determined whether the second chain moving operation has been performed to return the chain 95 after the chain 95 has been skipped. When the determination in step S4 is NO (no switches have been operated), the process returns to step S2.

The process advances from step S2 to step S10 when the first switch 131u is determined to be "on". In step S10, a determination is made as to whether the shifted position signal FPOS indicates the second position SP2; i.e., whether the chain 95 is already in the second position SP2. The shifted position signal FPOS varies among three levels, which are the first through third positions. The relationship between the shifted position signal FPOS and the output of the position sensor 128f is stored in the storage unit of the front control unit 127f.

When the shifted position signal FPOS indicates SP2, the process advances to step S3 without any further processing because the gears cannot be upshifted any further. When the shifted position signal FPOS does not indicate SP2 (i.e., when the signal indicates SP1), the process advances to step S11, where the shifted position signal FPOS is changed to SP2 and the process then advances to step S3. The motor 125f is thereby rotated and the front derailleur 97f is moved in the upshifting direction to the second position SP2.

When it is determined that the third switch 131d has been turned "on", the process advances from step S3 to step S12. In step S12, a determination is made as to whether the shifted position signal FPOS indicates the first position SP1. When the shifted position signal FPOS indicates SP1, the process advances to step S4 without any further processing because the gears cannot be downshifted any further. When the shifted position signal FPOS does not indicate SP1 (i.e., when the signal indicates SP2), the process advances to step S13, where the shifted position signal FPOS is changed to SP1 and the process then advances to step S4. The motor 125f thereby rotates and the front derailleur 97f moves in the downshifting direction to the first position SP1.

The process advances from step S3 to step S14 when the second switch 132u is determined to be "on". In step S14, the shifted position signal FPOS is unconditionally changed to the third position SP3. The motor 125f thereby rotates and the front derailleur 97f moves in the upshifting direction towards the third position SP3. In step S15, a determination is made as to whether the second switch 132u has been turned "off". The process continues to return to step S14 and the front derailleur 97f continues to move towards the third position SP3 until the second switch 132u turns "off". When the second switch 132u turns "off", the process returns to step S16, and the shifted position signal FPOS is changed to the second position SP2. The front derailleur 97f thereby moves slightly in the downshifting direction to the second position SP2, and the process returns to step S2.

Control is similarly performed with the rear control unit 127r, with the gears are shifted up and down one level or multiple levels at a time in accordance with the upshifting and downing operations of the gearshift operating part 121r.

In the display control unit 118, the shifted position information FPOS is acquired and the shifted position is displayed when the power supply is switched "on".

In the second chain moving operation by moving the operating member 121b to the third operating position, the front derailleur 97f can be moved to the third position SP3 past the second position SP2 of the sprocket F2 having the largest number of teeth. The chain 95 is easily guided to the sprocket F2 when the chain skips. Therefore, it is easy to continue to ride the bicycle even when the chain skips.

Other Embodiments

In the previous embodiment, the gearshift operating parts 121f and 121r were mounted separately on the brake levers 116r and 116f but the mounted positions of the gearshift operating parts 121f and 121r are not limited to those of the previous embodiment. For example, the gearshift operating parts 121f and 121r can be mounted on the brake brackets 117r and 117f, or at any location on the frame 102, including the handlebar unit 104.

Figure 10:
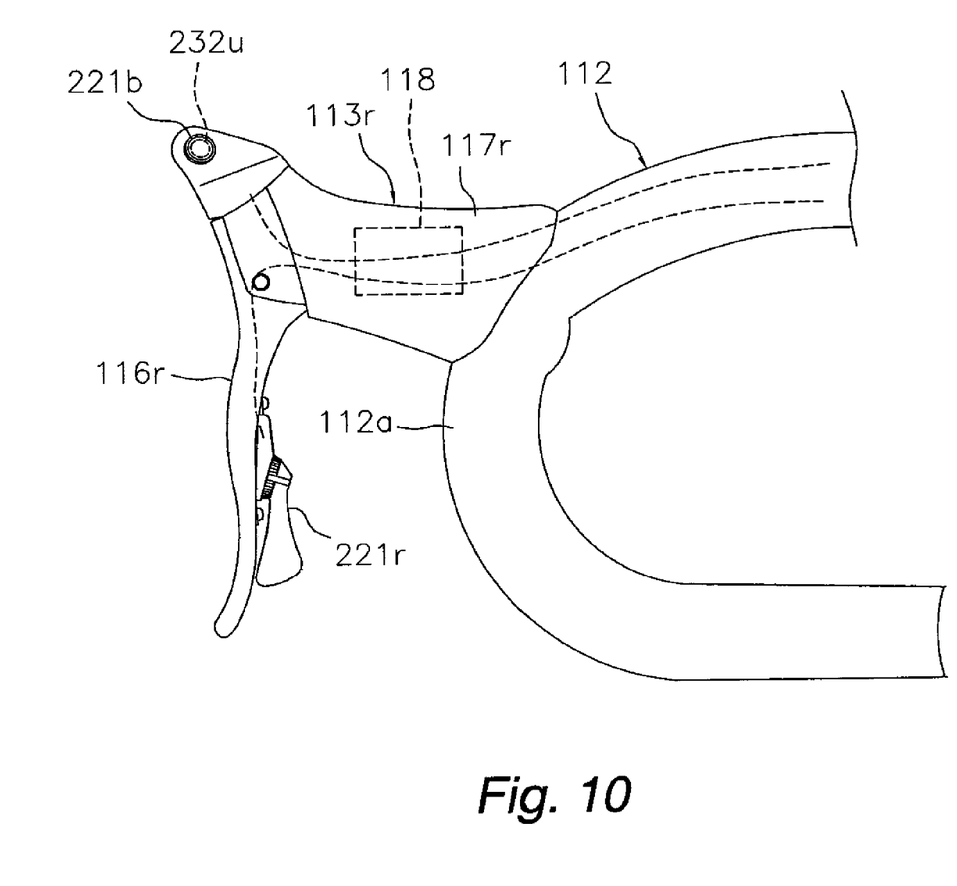
FIG. 10 is an enlarged, side elevational view, similar to FIG. 3, of the area of the right end of the handlebar with a modified rear bicycle gear shifter.

In the previous embodiment the second switch 132u is turned "on" by the gearshift operating part 121f, but another option is to provide an individual (separate and distinct) operating member 221b for operating a second switch 232u, as shown in FIG. 10. This operating member 221b is provided to the inside surface of the brake bracket 117r, for example. The second switch 232u is a pushbutton switch that is depressed by the operating member 221b, and this switch is "on" only while the operating member 221b is depressed. The mounted position of the operating member 221b is not limited to the brake bracket, and the operating member may be mounted on the brake lever or at any location on the frame 102, including the handlebar unit 104.

Figure 11:
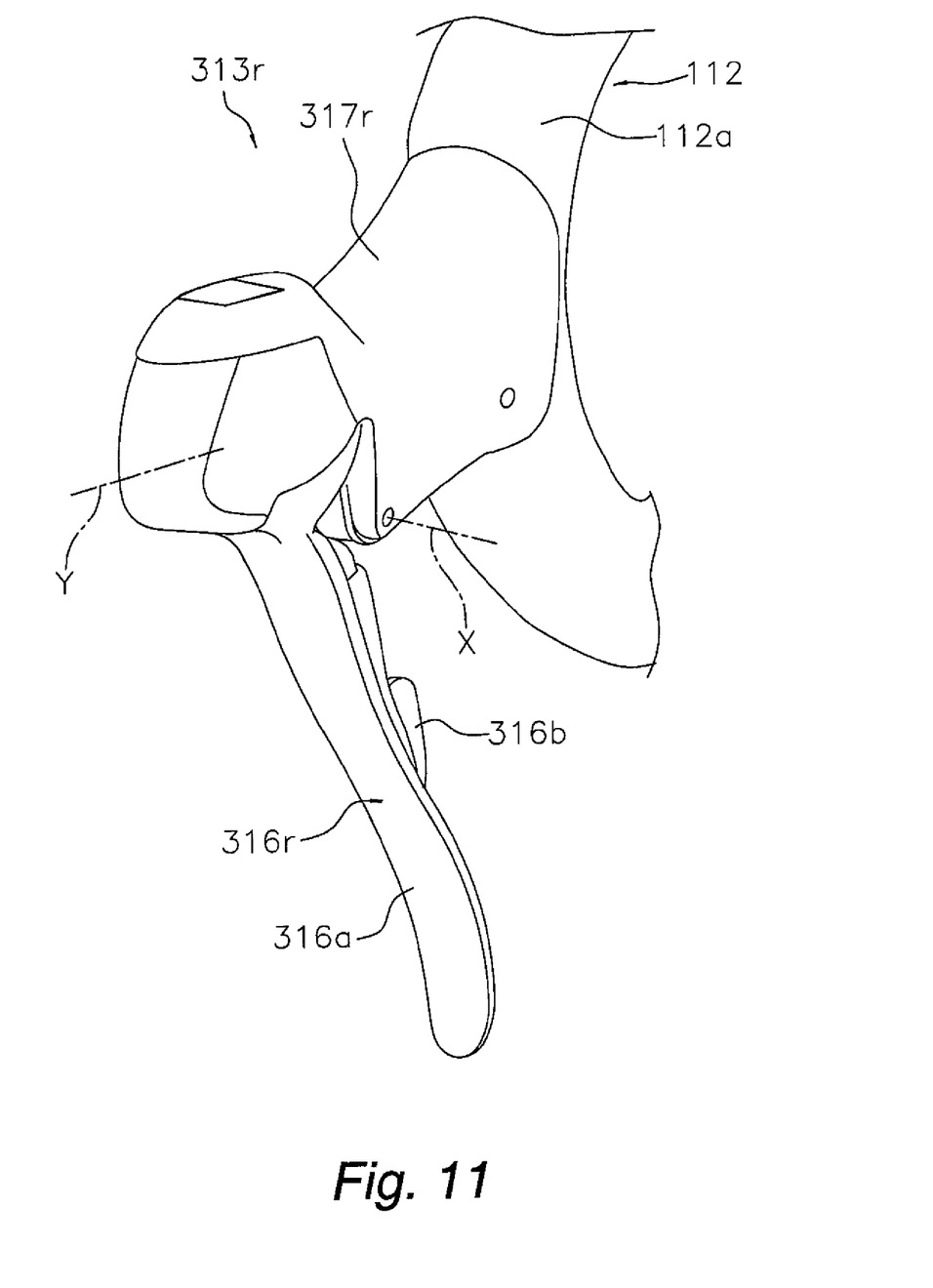
FIG. 11 is a perspective view of the area surrounding the right end of the handlebar with a modified rear bicycle gear shifter in accordance yet another embodiment.

In the previous embodiment, the gearshift operating part 121f or 121r was configured with the mounting unit 121a and the operating member 121b that are mounted on the reverse side of the brake lever 116r, but the present invention is not limited to this option alone. For example, another option is to mount the brake lever 316r on a brake bracket 317r, with the brake lever 316r being allowed to swing around a first pivot axis X. In this option, the brake lever 316r has a first lever member 316a that swings around a second pivot axis Y intersecting the pivot axis X, and also has a second lever member 316b that swings around the second pivot axis Y or around an axis parallel thereto, as shown in FIG. 11.

In this case, a braking operation is performed when the first lever member 316a swings around the first pivot axis X. When, similar to the previous embodiment, the second lever member 316b is swung between two levels on the inside or outside of the handlebar 112 around the second pivot axis Y or an axis parallel thereto, a first chain moving operation and second chain moving operation are performed for upshifting and returning the chain. Three switches are also placed to perform the third chain moving operation for downshifting when the second lever member 316b is swung on the inside or outside. The three switches can be placed so that the first and third chain moving operations for upshifting and downshifting are performed as a result of the second lever member 316b pivoting in either direction, and the second chain moving operation for returning the chain is performed as a result of the first lever member 316a pivoting in one direction on the inside or the outside.

In the previous embodiment, two gearshift operating parts pivoting in two directions were provided separately to a front derailleur and a rear derailleur, but two gearshift operating parts can also be provided for each shifting direction. For example, another option is to use one gearshift operating part for upshifting the front derailleur and rear derailleur, to use another gearshift operating part for downshifting the front derailleur and rear derailleur, and to provide a second switch to either of the gearshift operating parts to perform the second chain moving operation for returning the chain.

In the previous embodiment, a second switch was provided for the second chain moving operation, but the second chain moving operation may also be performed by double-clicking or holding down the first switch 131u for the first chain moving operation, for example, or by another special operation different from the first chain moving operation.

In the previous embodiment, the gearshift operating part 121f for the front derailleur 97f was provided on the left side with the front brake lever 116f, and the gearshift operating part 121r for the rear derailleur 97r was provided on the right side with the rear brake lever 116r. However, the present invention is not limited to this option alone, the front and rear braking parts can be on either side of the handlebar 112 operation units as needed and/or desired. Likewise, the front and rear gearshift operating parts can be on either side of the handlebar 112 operation units as needed and/or desired.

In the previous embodiment, the system waits until the second switch 132u turns off before returning the chain guide from the third position SP3 to the second position SP2, but the chain guide may also be returned to the second position SP2 a specific time after the second switch 132u is turned "on". This type of control is particularly preferred in cases in which the second chain moving operation is implemented by a special operation, as is the case in the other embodiment.

In the previous embodiment, the invention was described using an example of two front sprockets 99f and ten rear sprockets 99R, but it is preferable that there be two or three front sprockets 99f and six through ten rear sprockets 99r. In the case of three front sprockets 99f, the third position SP3 is located farther outward in the axial direction than the second position of the largest-diameter sprocket having the largest number of teeth, as previously described.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shifting control apparatus comprising:
   a gearshift operating part configured and arranged to output a first chain moving operation and a second chain moving operation for a front derailleur; and
   an actuating unit operatively arranged to selectively move the front derailleur between a plurality of gear positions in response to operation of the gearshift operating part, the actuating unit including
      a first actuating part configured and arranged to perform a first action which moves the front derailleur from a first gear position of the gear positions corresponding to a first sprocket having a smaller number of teeth to a second gear position of the gear positions corresponding to an adjacent second sprocket having a larger number of teeth in accordance with the first chain moving operation of the gearshift operating part; and
      a second actuating part configured and arranged to perform a second action which, within a single operation of the second actuating part,
         moves the front derailleur to a third non-gear position located past the second position corresponding to the second sprocket having the larger number of teeth in accordance with the second chain moving operation of the gearshift operating part, with the third non-gear position not corresponding to a sprocket position, and
         subsequently moves the front derailleur back to the second position.

2. The bicycle shifting control apparatus according to claim 1, wherein
   the gearshift operating part includes a rider operating member, a first electrical switch configured and arranged to perform the first chain moving operation when the rider operating member is moved from a first operating position to a second operating position and a second electrical switch configured and arranged to perform the second chain moving operation when the rider operating member is moved from one of the first and second operating position to a third operating position.

3. The bicycle shifting control apparatus according to claim 2, wherein
   the rider operating member is moved from the first operating position through the second operating position to the third operating position, with the rider operating member closing the first and second electrical switches disposed separately at the second and third operating positions when the rider operating member is operated from the first operating position to the third operating position.

4. The bicycle shifting control apparatus according to claim 3, wherein
   the operating member is mounted to pivot around an axis, with the first, second and third operating positions being disposed at intervals in a moving direction of the operating member about the axis.

5. The bicycle shifting control apparatus according to claim 1, wherein
   the gearshift operating part includes a first rider operating member, a first electrical switch configured and arranged to perform the first chain moving operation when the first rider operating member is operated, a second rider operating member, and a second electrical switch configured and arranged to perform the second chain moving operation when the second rider operating member is operated.

6. The bicycle shifting control apparatus according to claim 1, wherein
   the gearshift operating part is further configured and arranged to output a third chain moving operation for the front derailleur; and
   the actuating unit further includes a third actuating part configured and arranged to perform a third action for moving the front derailleur from the second position to the first position in accordance with the third chain moving operation of the gearshift operating part.

7. The bicycle shifting control apparatus according to claim 1, wherein
   the actuating unit is configured to locate the third position within a range of 0.2 mm to 7.5 mm past the second position.

8. The bicycle shifting control apparatus according to claim 2, wherein
   the gearshift operating part is further configured and arranged to output a third chain moving operation for the front derailleur; and
   the actuating unit further includes a third actuating part configured and arranged to perform a third action for moving the front derailleur from the second position to the first position in accordance with the third chain moving operation of the gearshift operating part.

9. The bicycle shifting control apparatus according to claim 2, wherein
   the actuating unit is configured to locate the third position within a range of 0.2 mm to 7.5 mm past the second position.

10. The bicycle shifting control apparatus according to claim 3, wherein
    the gearshift operating part is further configured and arranged to output a third chain moving operation for the front derailleur; and
    the actuating unit further includes a third actuating part configured and arranged to perform a third action for moving the front derailleur from the second position to the first position in accordance with the third chain moving operation of the gearshift operating part.

11. The bicycle shifting control apparatus according to claim 3, wherein
    the actuating unit is configured to locate the third position within a range of 0.2 mm to 7.5 mm past the second position.

12. The bicycle shifting control apparatus according to claim 4, wherein the gearshift operating part is further configured and arranged to output a third chain moving operation for the front derailleur; and the actuating unit further includes a third actuating part configured and arranged to perform a third action for moving the front derailleur from the second position to the first position in accordance with the third chain moving operation of the gearshift operating part.

13. The bicycle shifting control apparatus according to claim 4, wherein
the actuating unit is configured to locate the third position within a range of 0.2 mm to 7.5 mm past the second position.

14. The bicycle shifting control apparatus according to claim 5, wherein
the gearshift operating part is further configured and arranged to output a third chain moving operation for the front derailleur; and
the actuating unit further includes a third actuating part configured and arranged to perform a third action for moving the front derailleur from the second position to the first position in accordance with the third chain moving operation of the gearshift operating part.

15. The bicycle shifting control apparatus according to claim 5, wherein
the actuating unit is configured to locate the third position within a range of 0.2 mm to 7.5 mm past the second position.

16. A bicycle shifting control apparatus comprising:
a gearshift operating part configured and arranged to output a first chain moving operation and a second chain moving operation for a front derailleur; and
an actuating unit operatively arranged to move the front derailleur in response to operation of the gearshift operating part, the actuating unit including
a first actuating part configured and arranged to perform a first action which moves the front derailleur from a first position corresponding to a first sprocket having a smaller number of teeth to a second position corresponding to an adjacent second sprocket having a larger number of teeth in accordance with the first chain moving operation of the gearshift operating part; and
a second actuating part configured and arranged to perform a second action which, within a single operation of the second actuating part,
moves the front derailleur to a third position located past the second position corresponding to the second sprocket having the larger number of teeth in accordance with the second chain moving operation of the gearshift operating part, and
subsequently moves the front derailleur back to the second position,
with an axial distance between the second position and the third position being 1 mm or less with respect to an axis of the first and second sprockets.

17. The bicycle shifting control apparatus according to claim 1, wherein
an axial distance between the second position and the third position is less than an axial distance between the first position and the second position with respect to an axis of the first and second sprockets.

18. The bicycle shifting control apparatus according to claim 1, wherein
the gearshift operating part is configured to output the first chain moving operation by outputting a first electric shift signal to the actuating unit, and to output the second chain moving operation by outputting a second electric shift signal to the actuating unit.

19. The bicycle shifting control apparatus according to claim 18, wherein
the actuating unit further includes an electric motor,
the electric motor being driven to move the front derailleur from the first gear position to the second gear position in response to the gearshift operating part outputting the first electric signal to the actuating unit, and
the electric motor being driven to move the front derailleur from the second gear position to the third non-gear position in response to the gearshift operating part outputting the second electric signal to the actuating unit.

20. The bicycle shifting control apparatus according to claim 16, wherein
the gearshift operating part is configured to output the first chain moving operation by outputting a first electric shift signal to the actuating unit, and to output the second chain moving operation by outputting a second electric shift signal to the actuating unit.

21. The bicycle shifting control apparatus according to claim 19, wherein
the actuating unit further includes an electric motor,
the electric motor being driven to move the front derailleur from the first position to the second position in response to the gearshift operating part outputting the first electric signal to the actuating unit, and
the electric motor being driven to move the front derailleur from the second position to the third position in response to the gearshift operating part outputting the second electric signal to the actuating unit.

* * * * *